July 6, 1926.  
K. CHRISTOPHERSON ET AL  
1,591,284

WEIGHING SCALE

Filed Nov. 14, 1924

Inventor  
KNUT CHRISTOPHERSON  
EMIL HOVICK  
BY  
ATTORNEY

Patented July 6, 1926.

1,591,284

UNITED STATES PATENT OFFICE.

KNUT CHRISTOPHERSON AND EMIL HOVICK, OF MINNEAPOLIS, MINNESOTA.

WEIGHING SCALE.

Application filed November 14, 1924. Serial No. 749,836.

This invention relates to weighing scales and the main object is to provide a scale of the type in which a rotating pointer is employed to indicate upon a dial the weight to be ascertained. A further object is to provide a scale mechanism which eliminates the necessity of springs which are usually associated with scales of this type, and to provide means, of a novel nature, for supporting the balancing devices so that they will operate smoothly, efficiently, and with as little frictional resistance as possible. Further and more specific objects will be disclosed in the course of the following specification, reference being had to the accompanying drawing, in which:

Figure 1:
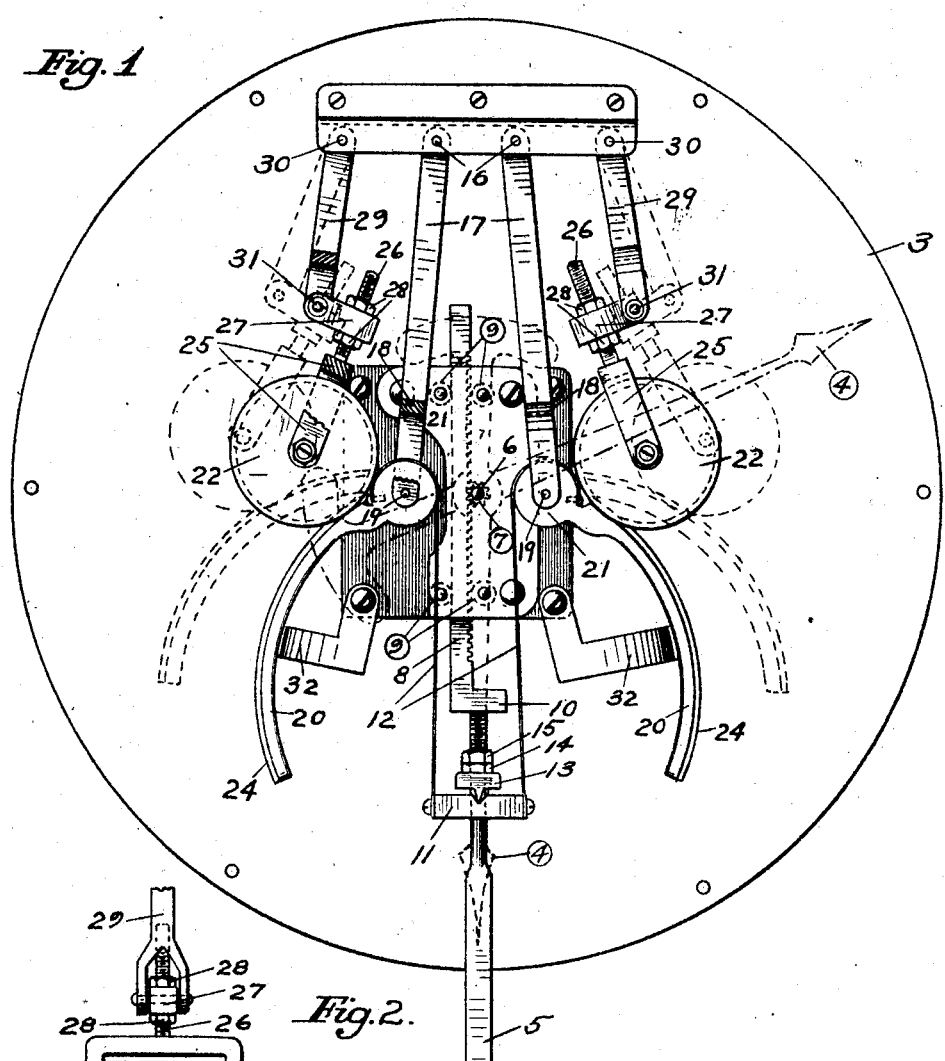
Fig. 1 is a rear view of a dial plate showing the balancing mechanism as mounted thereon, some parts being shown in section.
Figure 2:
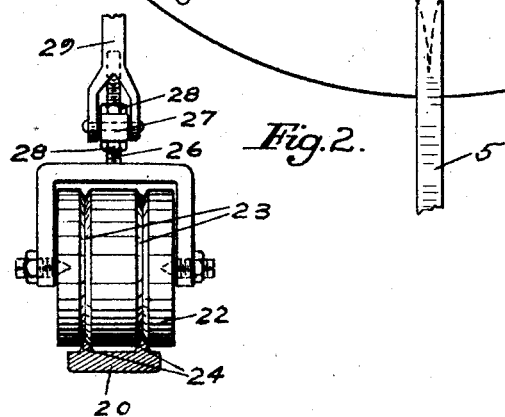
Fig. 2 is a side view of one of the balance rollers and its yoke, and showing the supporting rail therefor in section.

Referring to the drawing more particularly and by reference characters 3 designates the dial plate of a common form of scale, the plate being secured to a suitable casing, not shown, for properly housing the mechanism. The front face of the dial is provided with the usual weight indicating characters (not shown) and a common type of pointer 4 (shown in dotted lines) is employed to indicate the heft of the object being weighed. The weight of the object is transmitted to the mechanism by a draft rod 5 which is connected in any suitable manner with a weight pan, platform, hook or similar device, not shown.

The pointer 4 is secured upon a rotatable arbor 6 having a pinion 7, meshing with a rack 8 which is vertically movable between guide rollers 9. The rack 8 has a foot 10 which rests upon the upper end of the draft bar 5 in such a manner that when the bar 5 is moved or pulled down by an object or material to be weighed, the rack 8 will, by reason of its weight, follow with it, thus moving the pointer 4 away from zero and to the indicating character which will designate the proper weight of the object or material being weighed.

Slidably arranged on the draft rod 5 is a cross member 11 which is tiltably suspended, by steel tapes 12, under the knife edge of a fulcrum member 13, which is adjustably secured, for vertical adjustment on the rod 5, by a nut 14 and a lock nut 15. Thus, when the draft rod 5 is pulled down, the pull on the two tapes 12 will be equalized.

Pivotally secured, as at 16, near the upper end of the dial plate 3, is a pair of depending links 17, which are forked at their lower ends, as at 18, to pivotally receive (as at 19) the inner ends of a pair of floating beams or rails 20. The inner ends of these rails 20 are circular, or might be described as having integral rollers 21, over which are passed and secured the upper ends of the tapes 12, with a result that when the tapes are pulled down, as above indicated, they will cause the rails 20 to be raised upwardly, as indicated by the dotted lines in Fig. 1.

To variably resist the upward swinging movements of the rails 20, we provide a pair of counterbalance weights in the form of rollers 22, which are arranged to roll on the rails, and are provided with peripheral grooves 23 which are engaged by heads 24 on the track, so that the roller will properly guide on the rails. As the tension on the tapes 12 increases and the rails 20 are correspondingly raised higher it will be seen that the rollers 22 will be moved farther out from the fulcrums or pivots 19, thus increasing the resisting leverage proportionately. The tracks or beams 20 are preferably curved, as shown, and the proper degree and variableness of the curve will depend entirely upon the weight of the rollers 22, the distance of their travel with respect to the movement of the pointer and draft rod, and the weight, movement, dimensions and friction of the various parts of the mechanism.

The rollers 22 are rotatably carried in yokes 25, having threaded shanks 26 which are adjustably secured in members 27 by suitable nuts 28. The members 27 are pivotally carried by forked links 29 which are suspended from fixed pivots 30. The object of the joint 31 between the respective members 27 and 29 is to effect a flexing or yielding connection between the rollers 22 and the centers 30, and thus give a floating action to the rollers in such manner as to eliminate shocks or vibration to the mechanism should a heavy object be suddenly applied to the draft rod. It will also be seen, in that event, that the rollers will be thrust outwardly and the joint 31 will be caused to break inwardly by reason of the fact that the members 25, 26, 27 and 28 are on the inner side or between the joints thus having a tendency to drag slightly behind the outwardly thrust rollers, and effecting the desired break in such instances.

It will thus be seen that the greater the weight or tension applied to the draft rod 5 the greater will be the resistance affected by the counterweights, with a result that the pointer 4 will properly indicate, on the dial, the exact weight of the object being weighed, the weight characters having, of course, first been calculated and marked on the dial. Now, when the object has been removed from the scale the various parts of the mechanism will automatically return to their initial positions. A pair of flexible stop springs 32 are preferably provided as shown, to receive the rails 20, as they return to normal, and thus prevent any jar or vibration upon the return movement.

It is understood that various modifications may be made in the scale and in the balance mechanisms and other parts as herein shown and described, provided, however, that such modifications come within the spirit and scope of the appended claims.

Having now, therefore, fully shown and described our invention, what we claim and desire to protect by Letters Patent is:

1. A weighing scale comprising a draft device, means associated therewith for operating an indicator, a pair of depending links, a pair of levers carried at the lower ends of said links, means connecting the levers to the draft device whereby a pulling action on the latter will raise the longer ends of the levers, and counterbalancing devices adapted to travel on the levers as said longer ends are raised and lowered by the draft device.

2. A weighing scale comprising a draft device, means associated therewith for operating an indicator, a pair of curved levers carried on floating fulcrums and connected with said draft device, and flexibly suspended counterbalancing devices arranged to travel outwardly on said levers as the tension on the draft device is increased.

3. A weighing scale comprising a draft device, means associated therewith for operating an indicator, a pair of rails having integral rollers at their inner ends and fulcrumed so that their outer ends may be raised and lowered, tapes passed over said roller, at their upper ends, and connected to the draft device, at their lower ends, and counterbalancing weights arranged to be moved out and in on said rails as they are raised and lowered.

4. A weighing scale comprising a draft device, means associated therewith for operating an indicator, a pair of rails having integral rollers at their inner ends and fulcrumed so that their outer ends may be raised and lowered, tapes passed over said rollers, at their upper ends, and connected to the draft device, at their lower ends, means for equalizing the tension on said tapes, and counterbalancing weights arranged to be moved out and in on said rails as they are raised and lowered.

5. A weighing scale comprising a draft device, means associated therewith for operating an indicator, a pair of rails fulcrumed at their inner ends and connecting with the draft device so that when the latter is moved downwardly the outer ends of the rails will be raised from said fulcrums, a pair of counterbalance devices arranged to travel outwardly on the rails as the latter are raised and to return to inner normal positions when the rails are lowered to their initial position.

6. A weighing scale comprising a draft device, means associated therewith for operating an indicator, a pair of rails fulcrumed at their inner ends and connecting with the draft device so that when the latter is moved downwardly the outer ends of the rails will be raised from said fulcrums, a pair of counterbalance devices arranged to travel outwardly on the rails as the latter are raised and to return to inner normal positions when the rails are lowered to their initial position, and resilient means for receiving the rails as they are returned to their initial or inactive positions.

7. A weighing scale comprising a draft device, means associated therewith for operating an indicator, a pair of rails fulcrumed at their inner ends and connecting with the draft device so that when the latter is moved downwardly the outer ends of the rails will be raised from said fulcrums, a pair of counterbalance devices arranged to travel outwardly on the rails as the latter are raised and to return to inner normal positions when the rails are lowered to their initial position, and jointed link connections connecting the counterbalancing devices to fixed points above the rails.

8. In a scale, a draft device arranged to operate an indicator, a pair of depending links arranged above the device, a pair of rails fulcrumed at their inner ends to the lower ends of the links, the inner ends of said rails being circular, tapes passing, at their upper ends, over said inner rail ends, and secured at their lower ends to the draft device, counterbalance rollers arranged to travel in and out on the rails as they are lowered and raised, and means for adjustably mounting the rollers with respect to the rails.

In testimony whereof, we affix our signatures this 8th day of November, 1924.

KNUT CHRISTOPHERSON.
EMIL HOVICK.